No. 619,132. Patented Feb. 7, 1899.
J. M. BROWNING.
MAGAZINE FIREARM.
(Application filed Feb. 21, 1898.)
(No Model.) 5 Sheets—Sheet 2.

No. 619,132. Patented Feb. 7, 1899.
J. M. BROWNING.
MAGAZINE FIREARM.
(Application filed Feb. 21, 1898.)
(No Model.) 5 Sheets—Sheet 5.

UNITED STATES PATENT OFFICE.

JOHN M. BROWNING, OF OGDEN, UTAH, ASSIGNOR TO THE WINCHESTER REPEATING ARMS COMPANY, OF NEW HAVEN, CONNECTICUT.

MAGAZINE-FIREARM.

SPECIFICATION forming part of Letters Patent No. 619,132, dated February 7, 1899.

Application filed February 21, 1898. Serial No. 671,046. (No model.)

*To all whom it may concern:*

Be it known that I, JOHN M. BROWNING, of Ogden, in the county of Weber and State of Utah, have invented a new Improvement in Magazine-Firearms; and I do hereby declare the following, when taken in connection with the accompanying drawings and the letters of reference marked thereon, to be a full, clear, and exact description of the same, and which said drawings constitute part of this specification, and represent, in—

Fig. 3, a broken view of the gun in vertical longitudinal section, showing its parts in the positions due to them after the breech-block has been lifted into its unlocked position in the opening of the gun; Fig. 4, a corresponding view showing the gun open; Fig. 6, a view in vertical transverse section, taken on the line $a\,b$ of Fig. 4, showing the magazine filled with cartridges; Fig. $6^a$, a detached plan view of the deflector; Fig. 7, a detail view, in transverse section, on the line $c\,d$ of Fig. 3, showing the connection of the forward end of the magazine-cover with the gun; Fig. 8, a detached view, in right-hand side elevation, of the breech-block, which is slightly broken away to show the mode of holding the extractor in place; Fig. 9, a view in horizontal longitudinal section on the line $e\,f$ of Fig. 8; Fig. $9^a$, a detached plan view of the extractor; Fig. 10, a view of the breech-block in vertical tranverse section on the line $g\,h$ of Fig. 9; Fig. 11, another view of the breech-block in transverse section on the line $i\,j$ of Fig. 8; Fig. 14, a detached view, in side elevation, of the operating or finger lever; Fig. 15, a plan view thereof; Fig. 17, an edge view thereof; Fig. 18, a detached view, in side elevation, of the trigger; Fig. 20, a detached view, in side elevation, of the safety-piece; Fig. $20^a$, a broken plan view of the rear end of the rearwardly-projecting arm of the safety-piece; Fig. 21, a front view thereof.

My invention relates to an improvement in magazine-firearms of the lever type, the object being to produce an effective, reliable, and safe arm constructed with particular reference to lightness and to compactness of form.

With these ends in view my invention consists in a magazine-firearm having certain details of construction and combinations of parts, as will be hereinafter described, and pointed out in the claims.

I have chosen for illustration and description the embodiment of the several features of my invention in a firearm having a box-magazine adapted to receive two independent columns of cartridges located side by side; but my invention is applicable for use in arms having box-magazines constructed to receive a single column of cartridges, as well as firearms of the tubular magazine type or single shotguns.

In carrying out my invention as herein shown I employ a breech-block A, which is mounted in the receiver portion B of the gun-frame, so as to be longitudinally movable for being moved into its opened and closed positions and so as to be vertically movable for being moved into its locked and unlocked positions. By reason of its having these twofold movements the breech-block becomes one of the so-called "compound-movement" type. For being moved back and forth and up and down the breech-block is pivotally connected by means of a breech-block pivot-pin C with the upper end of an operating-link D, which is loosely connected by an operating-pin E with an operating or finger lever F, which is pivotally hung on a pivot-pin G, the ends of which extend through the chambered tang portion B' of the gun-frame. As shown, the said pivot-pin C is formed with a transversely-arranged socket receiving a small spiral spring $c$, which acts as a friction device for preventing the escape of the pin; but this friction-spring may be dispensed with, if desired. To adapt the operating-lever F to receive the operating-link D, its forward or upper portion is constructed with a long centrally-arranged longitudinal slot F', which forms two corresponding yielding arms F² F². The operating-pin E aforesaid extends at its ends into oppositely-located corresponding operating-slots F³, formed in the said arms F² F² of the operating-lever and shaped so as to impart the required movements to the operating-link for lifting the breech-block in unlocking and drawing it down in locking. The said operating-pin E is provided, as shown, with a small radial pin e, which is received in a slot formed in the operating-link D and which in case the operating-pin E tends to escape when the gun is open engages with the inner faces of the arms F² F² aforesaid and prevents the escape of the pin E, which when the gun is in its closed position is prevented from escaping by the side walls of the chambered tang portion B' of the gun-frame. For supporting the operating-link, and hence the breech-block, in their elevated positions, in which they are supported from the time the breech-block is unlocked, which is at the beginning of its opening movement, up to the time that it is closed, which is at the end of its closing movement, I provide the operating-link with a pin H, which on account of its function I shall hereinafter call the "supporting-pin." The ends of this pin extend into and ride upon the concaved lower walls of two oppositely-located supporting-slots B², formed in the side walls of the chambered tang B', and struck from the center of the pin-holes formed in the said side walls for the reception of the operating-lever pivot-pin G, before mentioned. The forward ends of these slots are formed with downwardly and rearwardly extending arms or extensions B³, which are located substantially in line with the operating-link D when the gun is in its closed position, at which time these arms are also substantially in line with a longitudinally-arranged clearance-slot D', formed in the lower end of the link and receiving the operating-lever pivot-pin G, which performs an additional function in guiding and supporting the lower end of the said link, which, as aforesaid, is loosely connected with the operating or finger lever, but positively connected, so to speak, with the breech-block by the breech-block pivot-pin C. If desired, the ends of the slot D' might be used in limiting the endwise movement of the operating-link D. For the clearance of the operating-pin E, I form two oppositely-located circular clearance-openings F⁴ in the arms F² of the operating or finger lever, which I preferably lighten by the formation in the said arms of two larger oppositely-located circular openings F⁵, which may, however, be changed in form or dispensed with altogether. To provide for locking the breech-block in its closed position, its lower face is formed with a wide transverse slot A', the forward wall A² of which constitutes a recoil-face which coacts with a recoil-face B⁴, formed upon the upper forward edge of a transversely-arranged heavy integral tie B⁵, which unites the rear ends of the side walls of the receiver portion B of the gun-frame.

Figures 1, 2:
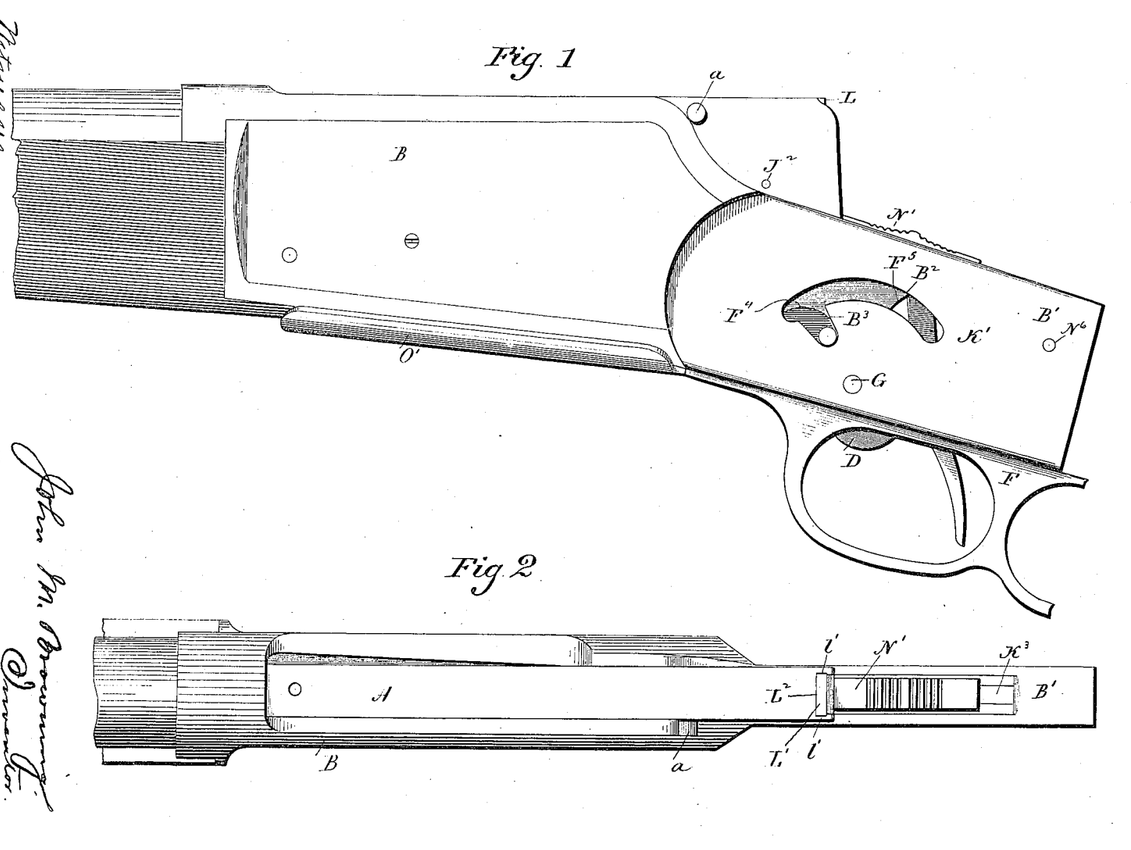
Figure 1, a view in side elevation of the gun, showing it closed and with its stock removed.
Fig. 2, a similar plan view of the gun.
Figures 3, 6, 6A, 7:
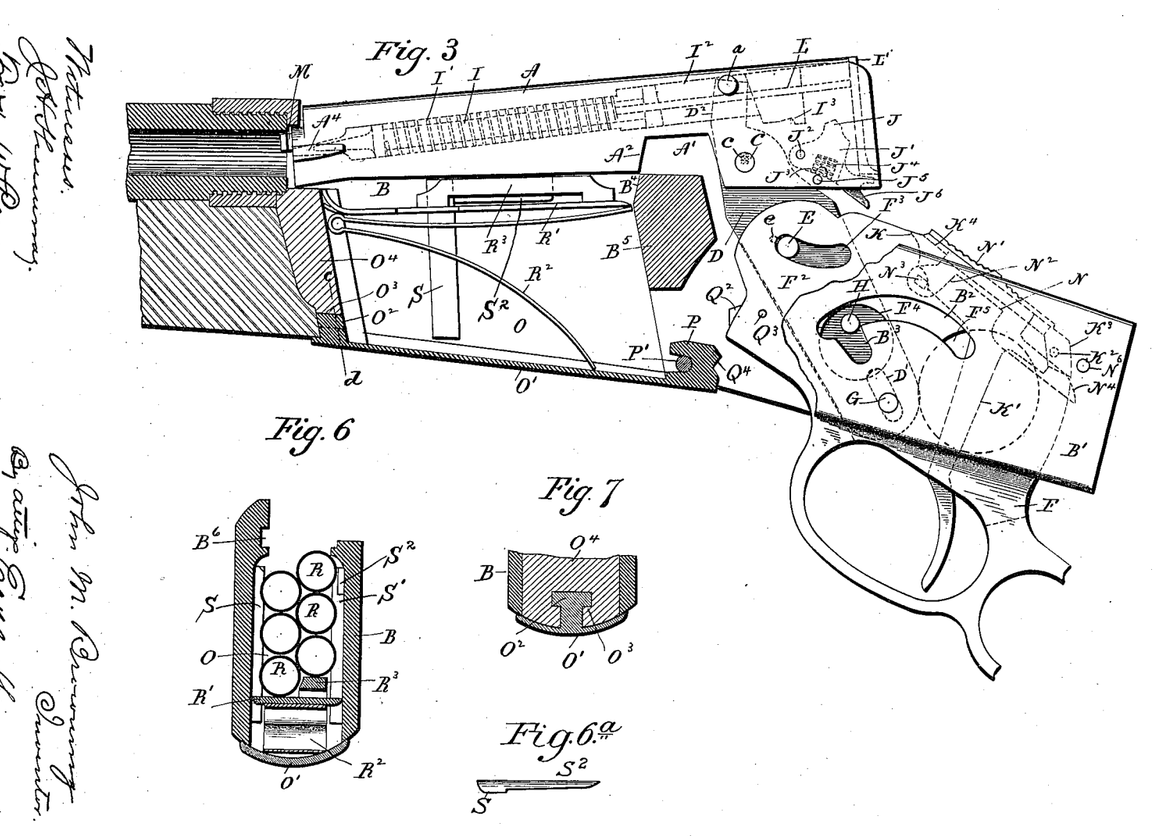
Figures 4, 8, 9, 9A, 10, 11:
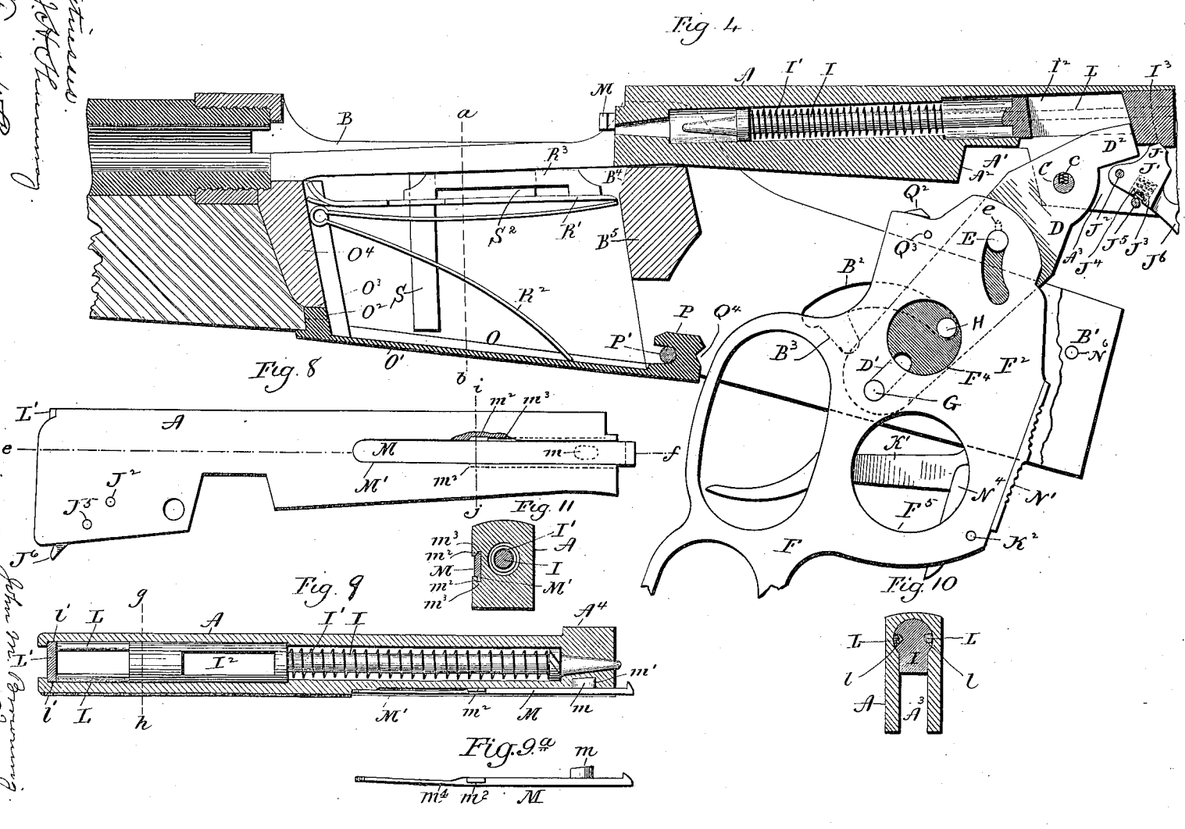
Figures 5, 12, 13:
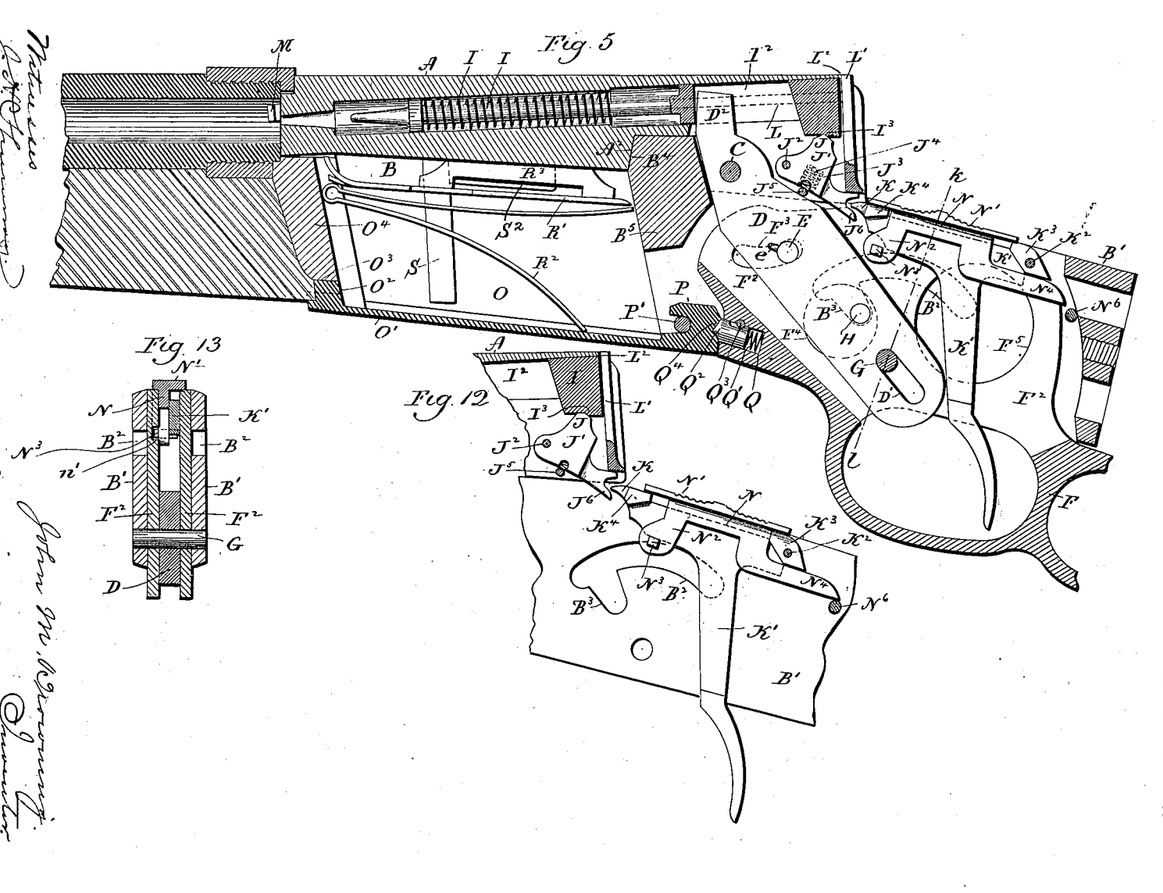
Fig. 5, a corresponding view showing the gun closed.
Fig. 12, a broken view of the gun, partly in elevation and partly in vertical section and designed to show the construction and arrangement of the trigger and the safety-piece which may be employed to lock it.
Fig. 13, a view of the same parts in vertical transverse section on the line $k\,l$ of Fig. 5.

Having now described the connection of the breech-block with the operating-lever as being by means of an operating-link pivoted to the breech-block and loosely connected with the lever, I will proceed to describe the operation of the parts mentioned in unlocking and locking the gun. When the gun is closed, as seen in Fig. 5, the operating-pin E, mounted in the link, is located at the rear ends of the operating-slots F³ of the lever, while the supporting-pin H, mounted in the link, is located at the lower ends of the arms B³, formed at the forward ends of the cam-like supporting-slots B², located in the side walls of the chambered tang B'. At this time also the operating-link is located in what may be termed its "depressed" position, at which time the upper end of its clearance-slot D' is registered with the operating-lever pivot-pin G. Now when the operating-lever F is started forward from its closed position the lower walls of its cam-like lifting-slots F³ coact with the operating-pin E, so as to impart a lifting movement to the operating-link D, which in turn lifts the rear end of the breech-block A until its recoil-face A² is entirely cleared from the recoil-face B⁴, formed by the tie B⁵ of the receiver portion of the gun-frame, as shown in Fig. 3. At the conclusion of this lifting movement of the link the operating-pin E will be located at the forward ends of the operating-slots F³ of the operating-lever and the supporting-pin H at the upper ends of the arms B³ of the supporting-slots B², formed in the side walls of the chambered tang portion B' of the gun-frame, all as shown in Fig. 3. Now as the operating-lever is pushed forward into its full-open position the breech-block will be drawn back by the coaction of the operating-pin E, carried by the operating-link, with the operating-slots F³, located in the lever, the link being held up to its work during this part of the opening movement of the gun by means of the supporting-pin H, which is mounted in it and which rides upon the convex lower walls of the supporting-slots B² aforesaid. In this manner the breech-block is drawn back to its full-open position, as shown in Fig. 4. During the closing movement of the gun the link is maintained in its elevated position by means of its said supporting-pin H, which rides back over the said convex lower walls of the supporting-slots B², from the forward ends of which it rides off into the upper ends of the arms or extensions B³ of the said slots simultaneously with the movement of the block into its locking position, which is also represented by Fig. 3. The operating-lever is at this time nearly in its closed position, and as it is drawn into the same the operating-pin E of the operating-link D coacts with the lower walls of the operating-slots F³, so as to positively draw the link, and hence the breech-block, downward, whereby the recoil-face A² of the breech-block is brought into position for coaction with the recoil-face B⁴ of the tie B⁵ of the gun-frame. During this last movement of the operating-link and breech-block the supporting-pin H of the link moves downward to the lower ends of the arms B³ of the supporting-slots B² of the gun-frame, while the clearance-slot D' of the link permits the same to move down over the operating-lever pivot-pin G, whereby the parts are brought back into the positions in which they are shown in Fig. 5. It will thus be seen that by loosely connecting the operating-link with the operating-lever I am enabled to lift the breech-block for unlocking it and draw it down for locking it, as well as imparting the required longitudinal movements to it for opening and closing it.

Within the breech-block I locate a longitudinally-movable firing-pin I, which combines the twofold functions of firing-pin and hammer, as the gun shown has no hammer proper and belongs to the type of hammerless guns. The forward end of this firing-pin is encircled by a spiral spring I', which I shall call the "mainspring," while its rear end is formed with a wide vertical slot I², which receives a retracting-finger D², formed at the upper end of the operating-link D, and acting to cock the firing-pin at the beginning of the opening movement of the gun, the retraction of the hammer at this time placing the mainspring I' under tension and bringing the cocking-notch I³, formed in the under face of the extreme rear end of the pin, into position to be engaged by the nose J of a sear J', hung upon a pivot J² and located within a vertical slot A³, formed in the lower face of the rear end of the breech-block. The said sear is formed with a circular recess J³ to receive the sear-spring J⁴, which is confined in place by a pin J⁵, mounted in the breech-block, from the rear lower corner of which the tongue J⁶ of the sear depends in position to be engaged by the nose K of the trigger K', which is suspended by a pin K², passing through its rear end and having its ends supported in the yielding arms F² F² of the operating or finger lever F, which plays within the chambered tang B' of the gun-frame. It will be noted that the tongue J⁶ of the sear is formed with a notch, which the nose K of the trigger K' enters when the trigger is lifted into its operating position by the movement of the operating-lever into its closed position. The said notch in the tongue J⁶ of the sear guides the nose of the trigger into place and promotes accuracy in the operation of the parts mentioned. The upper wall of the said notch engages with the lower end of the abutment-plate L' for limiting the upward movement of the rear end of the sear under the influence of the sear-spring J⁴, while the lower wall of the notch is beveled for lifting the nose of the trigger, which rides over it in the last portion of the closing movement of the gun.

For the purpose of holding the mainspring I' forward at the time of its compression I employ two corresponding horizontally-arranged mainspring-retaining rods L L, let into grooves $l$ formed in the opposite faces of the rear end of the firing-pin, as shown in Fig. 10, the rear ends of these pins abutting against a removable abutment-plate L', mounted in substantially a vertical position in the rear end of the breech-block, which is formed with a slot L² to receive it, the said slot having undercut ends $l'$ $l'$. It will be understood that the forward ends of these pins engage with the rear end of the mainspring I' and prevent the rearward movement of the spring during the retraction of the firing-pin, which therefore places the spring under tension by compressing it from its forward end. To remove the firing-pin, the abutment-plate L' is removed and the long retaining-rods L L withdrawn, after which the firing-pin may be withdrawn from the breech-block, bringing the mainspring with it. On the other hand, for the purpose of assembling the firing-pin and spring with the breech-block the firing-pin and spring are first introduced thereinto. The retaining-rods L L are then slipped into place, after which the abutment-plate L' is restored to the breech-block.

The extractor M is located in a long groove M', formed in the forward end of the right-hand face of the breech-block and held in place solely by its own spring-power. For that purpose it is formed at its forward end with an inwardly-projecting horizontally-arranged retaining-lug $m$, which plays back and forth in a horizontal recess $m'$, leading out of the bottom of the forward end of the said groove M'. The extractor is also formed about midway of its length and at opposite points upon its upper and lower edges with small retaining-flanges $m^2$ $m^2$, which when the extractor is in place are seated in the extreme inner ends of undercut grooves $m^3$ $m^3$, Figs. 8 and 11, leading out of the upper and lower walls of the said groove M' and extending inward from the forward end thereof to about midway of its length. The rear end of the extractor is made thinner than its forward portion, so as to form, as it were, a yielding tail $m^4$, which is located entirely to the rear of the retaining-flanges $m^2$ $m^2$ aforesaid, forward of which the extractor may be said to be rigid. The said tail is slightly bowed longitudinally, so that when the extractor is introduced into the groove M' from the forward end thereof its tail is straightened, and thus placed under enough tension to assist in holding the extractor in place, the lug $m$ preventing the extractor from endwise displacement, the flanges $m^2$ $m^2$ preventing its lateral displacement, and the spring-tail $m^4$ holding the said lug $m$ and the said flanges $m^3$ $m^2$ in their proper places and also giving a yielding action to the extractor with respect to the cartridges.

When so constructed, the extractor may be readily removed by pulling its forward end laterally outward sufficiently to clear the lug $m$ from the recess $m'$, after which the extractor may be drawn forward and out of the breech-block. It will be understood, of course, that the tail $m^4$ of the extractor yields to permit the forward end thereof to be pulled laterally outward, as described, preparatory to drawing the extractor forward out of the breech-block. This is a convenient construction, as it avoids the necessity of any pins or screws for holding the extractor in place.

For locking the trigger $K'$, I employ a longitudinally-movable safety-piece N, which is interlocked, so to speak, with the upper end of the trigger and which is supported upon the upper edges of the arms $F^2 F^2$ of the operating-lever, in which the trigger is mounted, as before stated, by means of a plate $N'$, forming a part of it and having its upper surface corrugated or otherwise roughened to permit the user of the gun to engage it with his fingers and move it back and forth. The said safety-piece is formed at its forward end with a depending arm $N^2$, carrying a locking-pin $N^3$, which normally clears the forward end of the lower edge of the trigger, as shown in Fig. 5, which represents the safety-piece in its normal or retracted position. When, however, the safety-piece is retracted into its operating position, the said locking-pin moves under the forward end of the lower edge of the trigger, as shown in Fig. 12, thus preventing the trigger from being swung on its pin $K^2$. When the safety-piece is thus moved backward, its rearwardly-extending arm $N^4$ passes under a lug $K^3$, formed at the rear end of the trigger, and locks the safety-piece at that point also, the trigger being formed at its rear end with the lug $K^3$ and at its forward end with a lug $K^4$ to permit the safety-piece to be set down into it, as shown, for instance, in Figs. 5, 12, and 13. The lug $K^4$, just mentioned, includes the nose K, before mentioned of the trigger. It will be understood by reference to these figures that the arms $N^2$ and $N^4$ of the safety-piece pass downward between the lugs $K^4$ and $K^3$ of the trigger, the arm $N^4$ of the safety-piece extending rearward under the lug $K^3$. The said arm $N^4$ of the safety-piece is formed with an offset or lateral projection $N^5$, which extends under the lug $K^3$ of the trigger and which is made wide enough to practically fill the slot $F'$ of the finger or operating lever, whereby the yielding arms $F^2 F^2$ of the lever are frictionally engaged with the said lug or extension $N^5$. Under this construction the rear end of the safety-piece is prevented from lateral play and is frictionally gripped and held away from engagement with the trigger, which must be free to operate. The arms $F^2 F^2$ of the lever are, as before mentioned, yielding arms and set inward enough so as to secure a friction-grip upon the arms $N^2$ and $N^4$ of the safety-piece, which passes downward between them, whereby the safety-piece is frictionally held against movement forward or back except as it is operated through the instrumentality of its plate $N'$.

Thus far I have spoken of the safety-piece as coacting with the trigger; but it has still another and very important function in locking the entire operating or finger lever in its closed position. This it does through its arm $N^4$, which when the safety-piece is drawn backward into its operating position slides over a transversely-arranged pin $N^6$, mounted in the rear end of the tang $B'$ of the gun-frame. This pin, however, might be replaced by any projection suitably arranged and suitably constructed for engagement by the said arm $N^4$ of the trigger-piece. Therefore when the safety-piece is drawn back into its operating position it not only locks the trigger, but also locks the operating or finger lever in its closed position, thus discharging a twofold function.

Figures 14, 15, 17, 18, 20, 20A, 21:
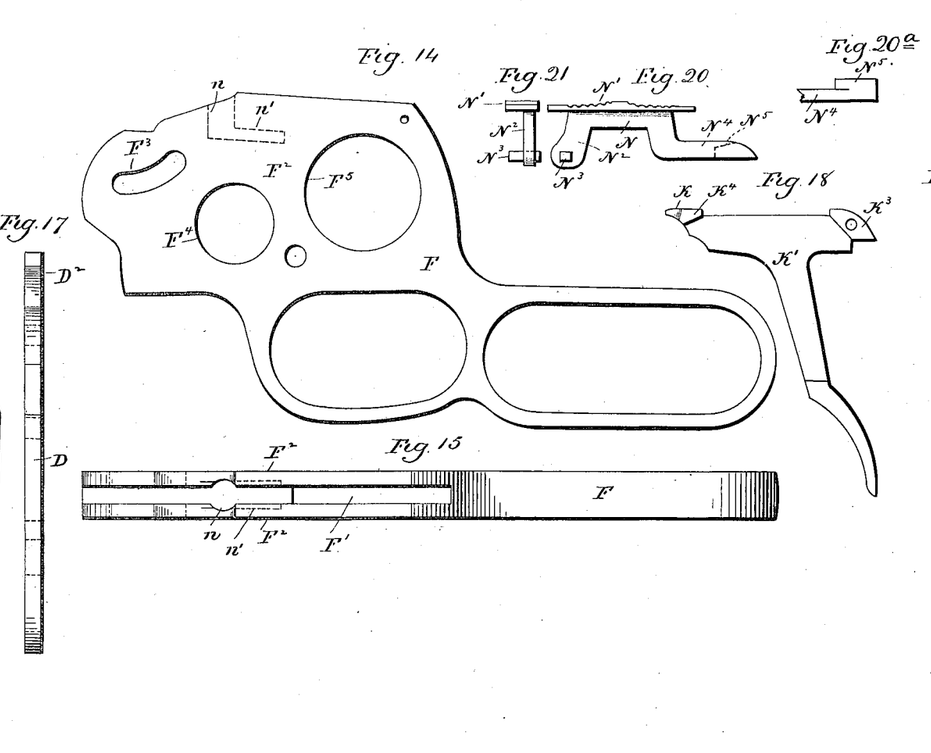
Figure 16:
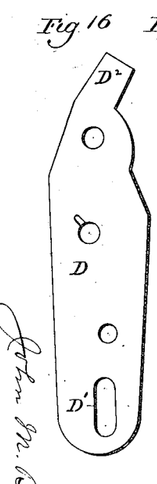
Fig. 16, a detached view, in side elevation, of the operating-link.
Figure 19:
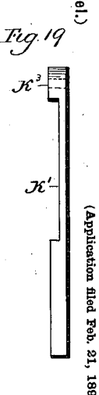
Fig. 19, an edge view thereof.

For assembling the safety-piece with the operating-lever and holding it in place thereupon I form in the inner faces of the arms $F^2 F^2$ of the operating-lever F two oppositely-located vertically-arranged entrance-grooves $n$ and two oppositely-located horizontally-arranged retaining-grooves $n'$, extending rearwardly from the lower ends of the said entering-grooves, as shown in Fig. 14. In applying the safety-piece to the lever the ends of its locking-pin $N^3$ are entered into the upper ends of the entrance-grooves $n$ of the lever. The safety-piece is then pushed downward to carry the said ends of the pin $N^3$ into the lower ends of the said entrance-grooves, after which the safety-piece is pushed rearward to enter the ends of the pin into the retaining-grooves, the upper walls of which then hold the safety-piece in place upon the lever with a capacity for being moved back and forth, as required, after its operation. It will readily be understood that by sliding the safety-piece forward until the ends of its pin $N^3$ emerge from the forward ends of the retaining-grooves $n'$ into the lower ends of the entrance-grooves $n$ it may be removed. I must also call attention to the fact that the safety-piece by being mounted upon the upper edges of the yielding arms $F^2 F^2$ of the operating or finger lever F extends upward through the chambered tang $B'$ of the gun-frame when the gun is closed, so that the safety-piece is always in sight when the gun is closed and located in a position in which it may be operated with facility. Furthermore, the mounting of the safety-piece in the operating-lever insures the removal of the safety-piece from the gun with the operating-lever, it being one of the features of my present invention that practically all of the parts of the gun are connected with the operating-lever, so as to be removed when the same is removed. This organization of the parts of the gun system with the operating-lever greatly facilitates the operations of assembling and dismembering the gun, as will be apparent.

The lower end of the cartridge-chamber O, formed within the receiver portion B of the gun-frame, is normally closed by means of a frictionally-fitted cover O', which is bowed in transverse section and formed at its forward end with a T-shaped retaining-head O², which is entered into a corresponding slot O³, formed in the lower end of a block O⁴, which forms the forward end wall of the cartridge-chamber O. The rear end of the said cover is provided upon its upper face with a heavy hook P, adapted by the formation in it of a forwardly-opening horizontal slot to engage with a coupling-pin P', horizontally arranged in the lower rear corner of the receiver portion of the frame. The said end connections of the cover are fitted so closely that the cover is practically held in place by friction. More than this, the operating-lever of the gun constantly tends to shove it forward, which it will do if by any chance it moves rearward. Moreover, the cover and operating-lever are constructed and arranged so that the lever may be utilized for driving the cover into its home position by throwing the lever into its extreme open position, at which time the forward edge of its lower portion will engage with the rear end of the cover and strike the same such a blow as to send it into its home position. In this way the lever may be used in place of a hammer to overcome the friction which resists the movement of the cover into its closed position.

For the purpose of locking the lever in its closed position it is provided near its forward end with a cylindrical socket Q for the reception of a spring Q' and a friction-pin Q², which is held in place by a stop-pin Q³ and beveled at its outer end to adapt it to be snapped into and forced out of a notch Q⁴ formed in the rear face of the hook P, before described. It will be understood that when the lever is brought into its closed position the beveled outer end of this pin will snap into the notch Q⁴ of the hook P and hold the lever in its closed position, from which it is readily started, however, by the exertion of the little additional force required to compress the spring Q' when the lever is started in being thrown forward into its open position.

The cartridges R, as shown in Fig. 6, are arranged in two independent columns of three each, both columns being supported and fed upward by a follower R', actuated by a spring R². The said follower is formed with a step R³, so as to lift one column of cartridges above the other, so that the cartridges of the respective columns will be fed alternately to the breech-block, by means of which they are pushed forward, and which is guided as it travels back and forth by a lug A⁴, located upon the forward end of its left-hand face and running back and forth in a longitudinal groove B⁶ formed in the upper edge of the inner face of the left-hand wall of the receiver portion B of the gun-frame. The upper edge of the right-hand wall of the said receiver portion of the gun-frame is cut away, as shown in Fig. 6, to permit the lateral ejection of the cartridges from the gun.

For the purpose of narrowing the forward portion of the cartridge-chamber O, I locate in it two uprights S S', (clearly shown in Fig. 6,) and for the purpose of insuring the freer feeding of the cartridges of the right-hand column I locate upon the inner face of the right-hand wall of the cartridge-chamber a horizontally-arranged wedge-like guide or deflector S², which may or may not be made integral with the upper end of the upright S'. This deflector operates to push the cartridges of the right-hand column inward under the extractor, whereby they are prevented from jamming or canting in being fed forward. No such deflector is required for coaction with the left-hand column of cartridges, as they are fed upward entirely free of the extractor, which is on the right-hand side of the chamber and which makes the use of the deflector necessary. The deflector may be characterized as a safeguard for insuring the movement of the cartridges of the right-hand column inward in front of the forward end of the breech-block. In the absence of this deflector if a cartridge of the right-hand column of cartridges should be slow in moving outward and upward the breech-block in its forward movement would gain on it to such an extent as to jam it under the extractor, which is located on the right-hand side of the breech-bolt and therefore over the right-hand column of cartridges.

To prevent the escape of gas or flame from the receiver, the bolt is provided with a stud or projection $a$, which when the bolt is in the closed position will stand directly back of the rear end of the groove B⁶, the rear end of which is necessarily open, so that without some such stud or projection on the breech-block to stand in line with the open rear end of the groove when the gun is fired some of the "fire" might strike back into the eyes of the user of the arm.

It is apparent that it is unnecessary to employ all of the several features of my invention in one gun, but that one or more of them may be used, as desired. It is also apparent that in applying my invention to guns other than those having box-magazines adapted to receive two independent columns of cartridges changes from the construction herein shown and described may be made. I would therefore have it understood that I do not limit myself to the details herein shown and described, but hold myself at liberty to make such changes and alterations as fairly fall within the spirit and scope of my invention.

Having fully described my invention, what I claim as new, and desire to secure by Letters Patent, is—

1. In a firearm, the combination with a compound-movement breech-block, of an operating-lever, an intermediate link pivotally connected with the breech-block and loosely connected with the operating-lever so as to have movement independent thereof and means for supporting the link and hence the breech-block from the time they are lifted for the unlocking of the block until they are depressed for the locking of the block.

2. In a firearm, the combination with a compound-movement breech-block, of an operating-lever, an intermediate link pivotally connected with the breech-block at its upper end, and loosely connected with the operating-lever by means of an operating-pin and an operating-slot which coact to lift the breech-block into its unlocked position, and to draw it down into its locked position, and a supporting instrumentality carried by the said link and coacting with the frame of the gun for supporting the link and hence the breech-block from the time they are lifted for unlocking the block until they are depressed for locking the block.

3. In a firearm, the combination with a compound-movement breech-block, of an operating-lever formed with an operating-slot, an intermediate lever pivotally connected at its upper end with the said breech-block, and provided with an operating-pin coacting with the said slot; and a supporting-pin mounted in the said link and coacting with a supporting-slot formed in the frame of the gun for supporting the link and hence the breech-block from the time they are lifted for the unlocking of the block until they are depressed for the locking of the block.

4. In a firearm, the combination with a gun-frame formed with a supporting-slot, of a compound-movement breech-block, an operating-lever formed with an operating-slot, and a link pivotally connected at its upper end with the breech-block, and provided with an operating pin or projection coacting with the said operating-slot and with a supporting pin or projection coacting with the said supporting-slot.

5. In a firearm, the combination with a gun-frame having a supporting-slot formed at its forward end with a downwardly-extending extension or arm, of a compound-movement breech-block, an operating or finger lever from the center of the pivot-pin of which the said supporting-slot is struck, and an intermediate link pivotally connected at its upper end with the said breech-block, and provided with an operating-pin which coacts with the said operating-slot, and with a supporting-pin which coacts with the said supporting-slot, and formed with a clearance-slot through which the pivot-pin of the said lever passes, and which permits the vertical movement of the link with respect to the lever and the gun-frame.

6. In a firearm, the combination with a compound-movement breech-block, of a firing-pin located therein, an operating-lever, an operating-link pivotally connected with the breech-block and coacting at its extreme upper end with the firing-pin to cock the same, and loosely connected with the lever by means of which it is raised and lowered for elevating and depressing the block, and by means of which it is swung for moving the block into its opened and closed positions.

7. In a firearm, the combination with a breech-block, of a firing-pin located therein, a spiral mainspring encircling the forward end of the firing-pin, two removable mainspring-retaining rods arranged to engage at their forward ends with the rear end of the said spring, and a removable abutment-plate located in the rear end of the breech-block and engaging with the rear ends of the said rods for holding them in place.

8. In a firearm, the combination with the frame thereof, of an operating-lever pivotally mounted therein and formed with two arms, of a trigger pivotally mounted between the upper portions of the said arms and extending downward into the finger-guard of the said lever, and a safety-piece located between the upper portions of the said arms at a point directly above the trigger so as to project slightly above the wrist portion of the frame of the gun when the lever is in its closed position, and adapted, when moved into its operating position, to engage directly with the trigger to prevent the operation thereof.

9. In a firearm, the combination with the frame thereof, of an operating-lever pivotally mounted therein and formed with two arms, of a trigger pivotally hung by its rear end between the said arms, and formed at its rear and forward ends with lugs, and a sliding safety-piece mounted upon the said arms of the lever at a point above the trigger and formed at its forward and rear ends with downwardly-extending arms which pass between the said lugs of the trigger and which are constructed to engage with the trigger near the forward and rear ends thereof, when the safety-piece is moved into its operating position, for holding the trigger against operation.

10. In a firearm, the combination with an operating-lever, of a trigger mounted therein, and a sliding safety-piece also mounted in the said lever and located above the said trigger, and coacting therewith to lock the same against movement, and formed at its forward end with a depending projection entering vertically-arranged entrance and longitudinally-arranged retaining grooves formed in the lever for the purpose of permitting the entrance of the safety-piece into the lever and its retention thereupon.

11. In a firearm, the combination with a gun-frame, the receiver portion of which contains a cartridge-chamber, of a sliding cover for the open lower end of the said chamber, the cover being adapted at its forward and rear ends for being frictionally coupled with the gun by forward sliding movement and an operating or finger lever mounted in the gun-frame and in its closed position forming an abutment for the rear end of the said cover which it will force forward into and keep in its proper position.

12. In a firearm, the combination with a gun-frame, the receiver portion of which contains a cartridge-chamber, of a cover for the open lower end of the said chamber, adapted at its forward end to have sliding connection with the gun-frame, and formed upon the upper face of its rear end with a hook having a forwardly-opening, horizontally-arranged slot to engage with a horizontally-arranged coupling-pin mounted in the gun-frame with which the cover is connected by sliding it forward; and an operating or finger lever mounted in the gun-frame and forming an abutment for the rear end of the said cover when the lever is in its closed position, whereby the cover is kept in place by the lever in addition to the frictional restraint formed by the sliding connections at its ends.

13. In a firearm, the combination with a gun-frame containing a cartridge-chamber for the reception of one or more columns of cartridges, of a cover for closing the lower end of the said chamber, and formed upon the upper face of its rear end with a hook which engages with a horizontally-arranged coupling-pin mounted in the gun-frame, an operating-lever mounted in the gun-frame, and a forwardly-projecting spring-actuated pin mounted in the said lever and engaging with the rear end of the said hook of the said cover for holding the lever in its closed position.

14. In a firearm, the combination with a breech-block, of a firing-pin mounted therein, a pivotal sear mounted in the rear end of the breech-block and coacting with the rear end of the firing-pin, an operating or finger lever pivoted in the frame of the gun, and coacting with the breech-block for operating the same, and with the firing-pin for cocking the same, and a trigger mounted in the lever for coaction with the sear.

15. In a firearm, the combination with a frame having a heavy transversely-arranged tie which unites the rear ends of the side walls of the receiver portion of the frame, of a compound-movement breech-block adapted to be moved back and forth in the frame for opening and closing the gun and to be raised and lowered therein at its rear end for being locked and unlocked, and formed in its under face with a transverse slot adapting it to be lowered down over the upper portion of the said tie which acts as a recoil-block for it, an operating-lever hung in the said frame and having its upper end connected with the breech-block at a point to the rear of the said slot therein, a firing-pin located in the said breech-block, a sear mounted in the rear end of the breech-block below the rear end of the firing-pin, and to the rear of the connection of the lever with the breech-block, and a trigger mounted in the said lever in position to coact with the said sear when the lever and breech-block are in their closed positions.

16. In a firearm, the combination with a breech-block formed at its rear end with a vertical slot, of a firing-pin mounted in the said breech-block and having its rear end formed with a vertical slot located in line with the vertical slot formed in the rear end of the breech-block, a sear pivotally mounted in the vertical slot in the breech-block and located below the extreme rear end of the firing-pin with which it coacts, and means carried by the operating-lever of the gun for extending upward through the vertical slot of the breech-block and into the vertical slot of the firing-pin for retracting and cocking the same.

17. In a firearm, the combination with an operating or finger lever, of a breech-block having its rear end formed with a vertical slot, a firing-pin mounted in the breech-block and having its rear end formed with a vertical slot located in line with the vertical slot of the breech-block, a sear pivotally hung by its forward end in the vertical slot of the breech-block at a point below the rear end of the firing-pin, and formed with a nose which coacts with the lower face of the rear end of the firing-pin, and with a rearwardly and downwardly projecting tongue, a spring coacting with the sear and tending to constantly throw it upward for engagement with the firing-pin, a trigger mounted in the operating or finger lever in position to coact with the tongue of the sear and means extending upward into the vertical slot of the breech-block and into the vertical slot of the firing-pin for operating the block and retracting and cocking the pin.

18. In a firearm, the combination with an operating or finger lever having its forward or upper end formed with two laterally-yielding arms separated by a deep vertically-arranged slot, of a trigger pivotally mounted between the said arms, and a safety-piece supported upon the upper edges of the said yielding arms and provided at its forward and rear ends with downwardly-projecting arms which coact with the trigger for locking the same against operation, and which extend downward between the yielding arms of the lever which grip it frictionally and normally hold it against movement forward or back.

19. In a firearm, the combination with the frame thereof, of a breech-block, a firing-pin mounted therein, a sear pivotally mounted within the rear end of the said block in position to coact with the extreme rear end of the firing-pin below which it is located, an operating or finger lever pivotally hung in the frame of the gun and extending upward into the rear end of the breech-block for the operation thereof, and for coaction with the firing-pin which it retracts and cocks, and a trigger mounted in the upper portion of the said lever in position to engage with the said sear when the lever is in its closed position.

20. In a firearm, the combination with a frame formed with a chambered tang, of an operating-lever pivotally hung within the said chambered tang, and formed with two arms the upper edges of which coincide with the upper edges of the side walls of the chambered tang when the lever is in its closed position, and a safety-piece located between the upper edges of the said arms of the lever, and projecting above the side walls of the chambered tang of the frame, and adapted when shifted in position to engage with a portion of the frame for locking the lever in its closed position.

21. In a firearm, the combination with a frame formed with a chambered tang, of an operating-lever pivotally hung within the said chambered tang, and formed with two arms the upper edges of which coincide with the upper edges of the side walls of the chambered tang when the lever is in its closed position, a trigger mounted between the said arms near the upper edges thereof, and a safety-piece also mounted between the said arms at a point above the trigger, and adapted to coact with the same for locking it against being operated and to engage with a part stationary with respect to the frame for locking the lever in its closed position.

22. In a firearm, the combination with a frame formed with a chambered tang, of an operating-lever pivotally hung within the said chambered tang and formed with two arms, the upper edges of which coincide with the upper edges of the side walls of the chambered tang when the lever is in its closed position, a trigger mounted between the said arms near the upper edges thereof, and a safety-piece also mounted between the said arms at a point above the trigger, and adapted at its forward end to engage with the trigger for locking the same against operation, and provided with a rearwardly-extending arm adapted to be engaged with a part stationary with respect to the gun-frame for locking the lever in its closed position.

23. In a magazine-firearm, the combination with a gun-frame having a cartridge-chamber adapted for the reception of two columns of cartridges located side by side, of a breech-closing instrumentality, an extractor located in one of the side faces of the said instrumentality, and a wedge-like cartridge-deflector arranged upon the inner face of the wall of the said chamber on that side of the breech-closing instrumentality in which the said extractor is located.

24. In a firearm, the combination with the breech-block thereof, of a firing-pin located therein, a sear pivotally mounted in the rear end of the said block and formed with a notch, of an operating or finger lever connected with the said block for operating the same, and a trigger carried by the said lever and formed with a nose adapted to enter the notch of the sear just as the gun is closed.

25. The combination with a breech-block, of a firing-pin located therein and introduced thereinto and removed therefrom through an opening formed in the rear end of the block, a spring encircling the firing-pin and therefore located within the said block, and introduced thereinto and removed therefrom through the said opening in the rear end thereof, a flat vertically-arranged plate mounted in the rear end of the block for closing the opening therein, and means interposed between the rear end of the spring and the said plate for causing the spring to be placed under tension when the firing-pin is retracted, the said plate virtually constituting an abutment for the rear end of the said spring.

26. In a firearm, the combination with a gun-frame the receiver portion of which contains a cartridge-chamber, of a sliding cover for the open lower end of the said chamber, the said cover being adapted at its forward and rear ends for being frictionally coupled with the gun by a forward sliding movement, and an operating or finger lever pivotally mounted in the gun-frame, the rear end of the said cover and the forward edge of the lower portion of the said lever being constructed and arranged so that when the lever is thrown into its open position, it will strike the rear end of the cover, and force it forward into its home position.

In testimony whereof I have signed this specification in the presence of two subscribing witnesses.

JOHN M. BROWNING.

Witnesses:
FREDERIC C. EARLE,
THOMAS C. JOHNSON.